(12) United States Patent
Ridgeway

(10) Patent No.: US 9,162,854 B1
(45) Date of Patent: Oct. 20, 2015

(54) TREE MOUNTED HOIST DEVICE

(71) Applicant: Danny Ridgeway, West Frankfort, IL (US)

(72) Inventor: Danny Ridgeway, West Frankfort, IL (US)

( * ) Notice: Subject to any disclaimer, the term of this patent is extended or adjusted under 35 U.S.C. 154(b) by 30 days.

(21) Appl. No.: 14/146,082

(22) Filed: Jan. 2, 2014

(51) Int. Cl.
*B66D 1/36* (2006.01)
*B66D 3/04* (2006.01)

(52) U.S. Cl.
CPC .................................... *B66D 3/04* (2013.01)

(58) Field of Classification Search
CPC ............................ A01M 31/006; A01M 31/02
USPC ................................................ 254/334, 338
See application file for complete search history.

(56) References Cited

U.S. PATENT DOCUMENTS

| | | | | |
|---|---|---|---|---|
| 3,298,459 | A * | 1/1967 | Bergsten | 182/92 |
| 3,568,797 | A * | 3/1971 | Hardy | 182/142 |
| 4,697,669 | A | 10/1987 | Bergstein | |
| 5,395,284 | A * | 3/1995 | Frisk | 452/187 |
| 5,806,508 | A | 9/1998 | Stempien et al. | |
| 5,899,124 | A | 5/1999 | Cross, Jr. | |
| 5,908,084 | A * | 6/1999 | Laurin et al. | 182/142 |
| 5,944,139 | A * | 8/1999 | Kozial | 182/92 |
| 6,561,477 | B1 | 5/2003 | Prive | |
| 6,695,688 | B1 * | 2/2004 | Owen et al. | 452/187 |
| 6,726,162 | B1 | 4/2004 | Winter | |
| 7,350,769 | B1 * | 4/2008 | Dorzok | 254/261 |
| 7,458,563 | B1 * | 12/2008 | Liu | 254/334 |
| 7,913,980 | B1 * | 3/2011 | Cipriano | 254/393 |
| 8,371,558 | B2 | 2/2013 | Engelman et al. | |
| 8,469,206 | B2 | 6/2013 | Wilson | |
| 8,511,433 | B2 | 8/2013 | Place | |
| 2003/0155475 | A1 | 8/2003 | Hicks | |
| 2003/0228838 | A1 * | 12/2003 | Gearhart | 452/187 |
| 2004/0256607 | A1 * | 12/2004 | Spitsbergen | 254/334 |
| 2007/0089932 | A1 * | 4/2007 | Boyett | 182/133 |
| 2007/0138359 | A1 * | 6/2007 | Johnson | 248/218.4 |
| 2008/0085669 | A1 * | 4/2008 | Burrows | 452/187 |
| 2009/0078500 | A1 * | 3/2009 | Wydner et al. | 182/3 |
| 2009/0272709 | A1 * | 11/2009 | Nessner et al. | 212/270 |
| 2010/0282788 | A1 | 11/2010 | Liberti | |
| 2011/0108787 | A1 * | 5/2011 | Thomas et al. | 254/393 |
| 2011/0260127 | A1 * | 10/2011 | Surgeon et al. | 254/362 |
| 2014/0264213 | A1 * | 9/2014 | Nipper | 254/390 |
| 2014/0304968 | A1 * | 10/2014 | LaFleur et al. | 29/428 |

OTHER PUBLICATIONS

TSS Heater Body Suit, www.heaterbodysuit.com State River Zip-Start Bow Holder;I The Sportsman Guide; www.sportsmanguide.com.

* cited by examiner

*Primary Examiner* — Emmanuel M Marcelo

(57) ABSTRACT

A tree mounted hoist device for mounting a hoist to a tree facilitates lifting of a tree stand or the like. The device includes a bracket having a first section and a second section. The first section is configured for coupling to a tree wherein the second section defines a step extending from the tree. An elongated member has a first end and a second end. The first end is coupled to the bracket wherein the elongated member extends from the bracket. A pulley is coupled to the elongated member in spaced relationship to the first end whereby the pulley is positioned in laterally spaced relationship to the tree.

12 Claims, 5 Drawing Sheets

TREE MOUNTED HOIST DEVICE

BACKGROUND OF THE DISCLOSURE

Field of the Disclosure

The disclosure relates to hoist devices and more particularly pertains to a new hoist device for mounting a hoist to a tree to facilitate lifting of game, a tree stand, or the like.

SUMMARY OF THE DISCLOSURE

An embodiment of the disclosure meets the needs presented above by generally comprising a bracket having a first section and a second section. The first section is configured for coupling to a tree wherein the second section defines a step extending from the tree. An elongated member has a first end and a second end. The first end is coupled to the bracket wherein the elongated member extends from the bracket. A pulley is coupled to the elongated member in spaced relationship to the first end whereby the pulley is positioned in laterally spaced relationship to the tree.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
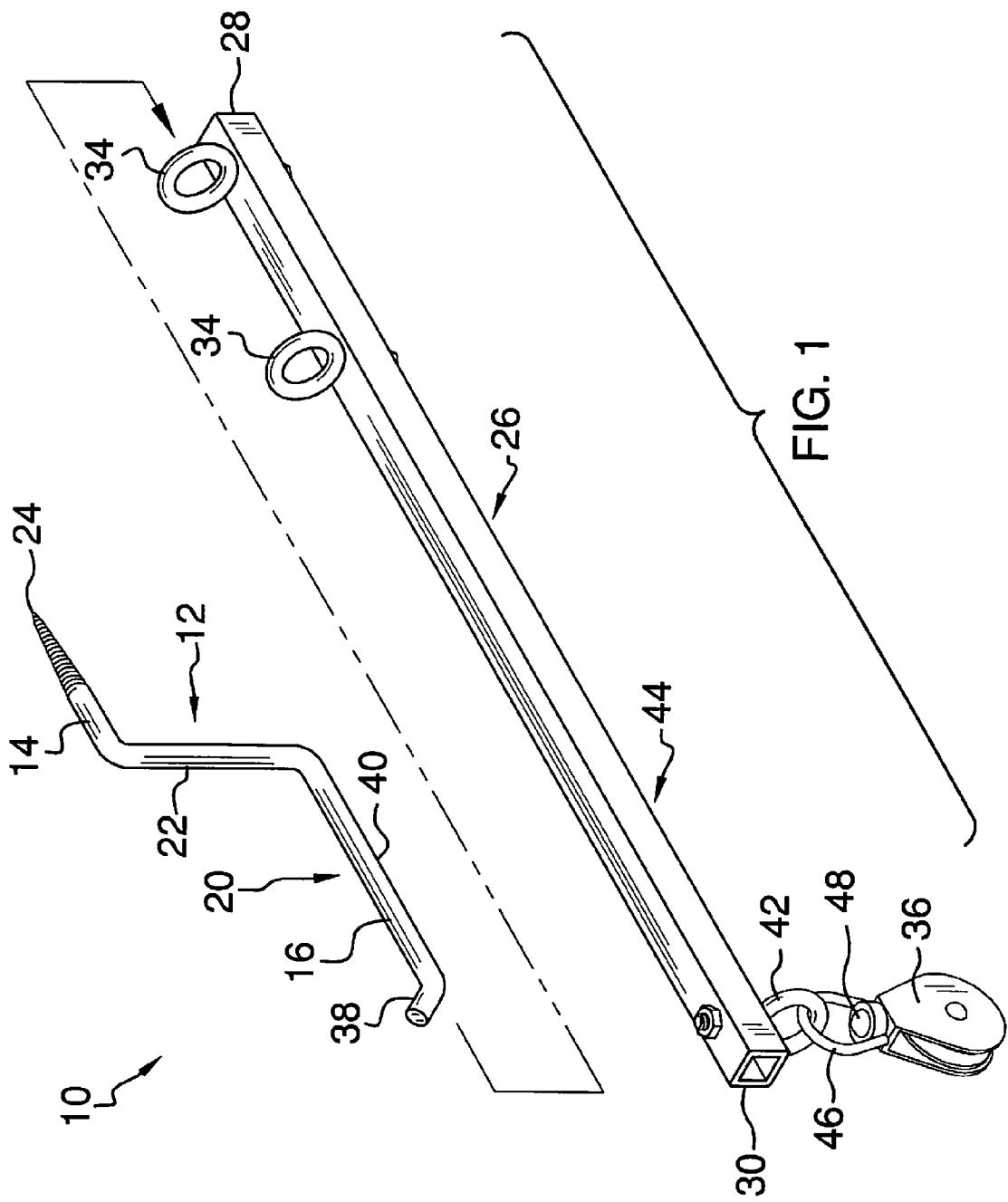
FIG. 1 is a partially exploded top front side perspective view of a tree mounted hoist device according to an embodiment of the disclosure.
Figure 2:
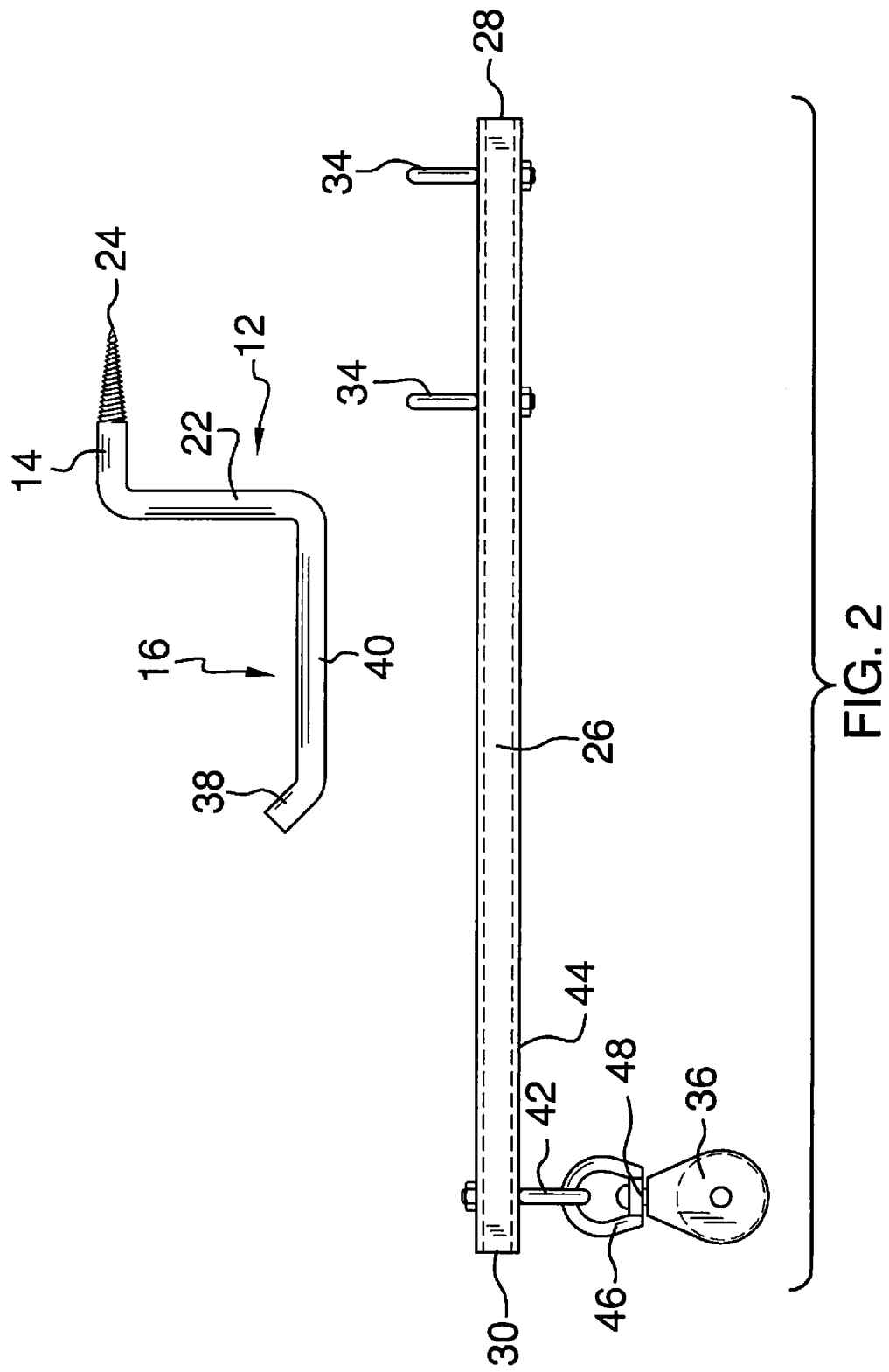
FIG. 2 is a side view of an embodiment of the disclosure.
Figure 3:
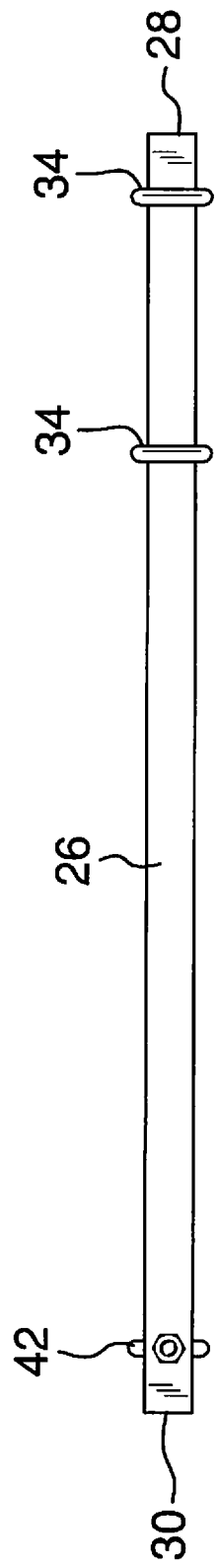
FIG. 3 is a top view of an embodiment of the disclosure.
Figure 4:
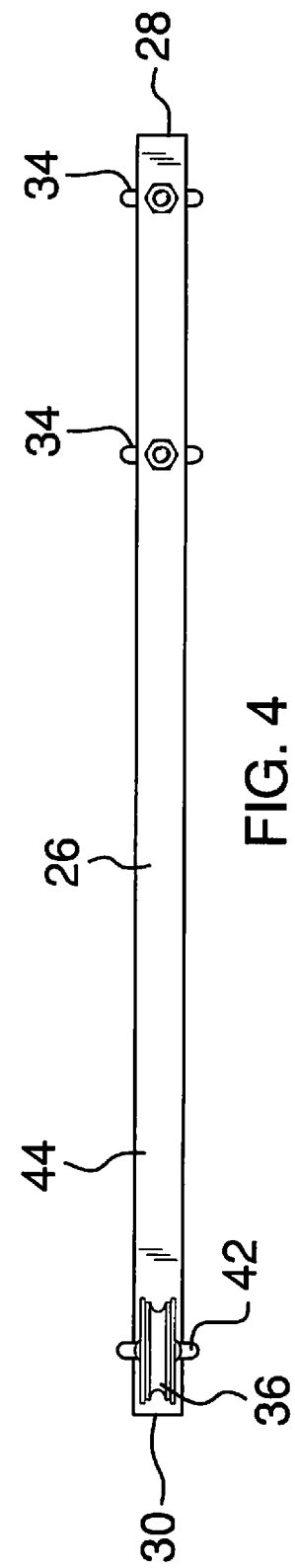
FIG. 4 is a bottom view of an embodiment of the disclosure.
Figure 5:
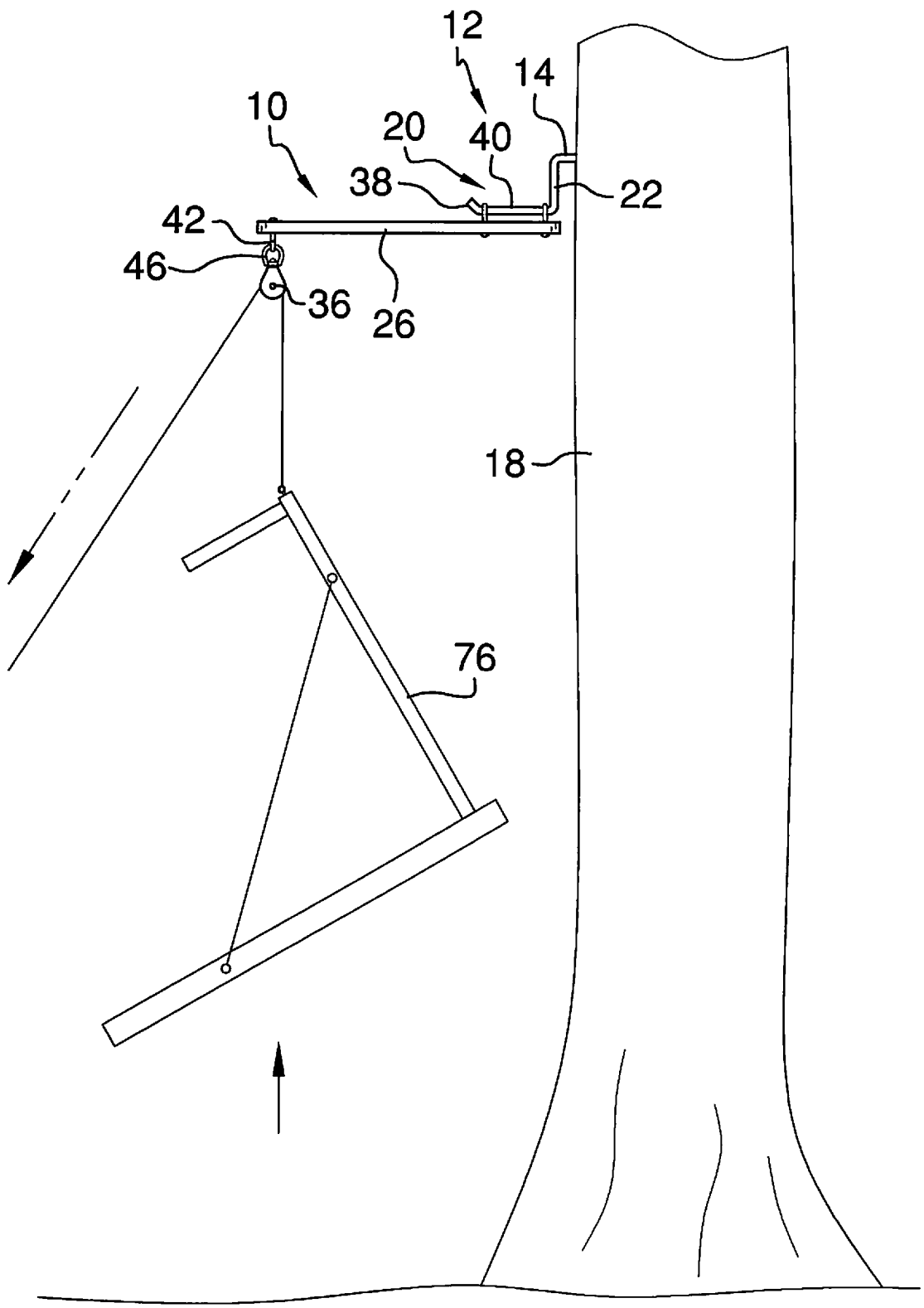
FIG. 5 is a side view of an embodiment of the disclosure in use.

With reference now to the drawings, and in particular to FIGS. 1 through 6 thereof, a new hoist device embodying the principles and concepts of an embodiment of the disclosure and generally designated by the reference numeral 10 will be described.

As best illustrated in FIGS. 1 through 6, the tree mounted hoist device 10 generally comprises a bracket 12 having a first section 14 and a second section 16. The first section 14 is configured for coupling to a tree 18 wherein the second section 16 extends outwardly from the tree 18 such that second section 16 defines a step 20 extending from the tree 18. The bracket 12 has a medial section 22 extending between the first section 14 and the second section 16 wherein the first section 14 is offset from the second section 16. The first section 14 and second section 16 may be parallel to each other. The first section 14 of the bracket 12 is threaded and has a pointed end 24 wherein the first section 14 is configured for screwing into the tree 18. The bracket 12 is generally similar to and may have the same structure as a pre-existing tree step.

An elongated member 26 has a first end 28 and a second end 30. The elongated member is stiff and may be made of steel tubing having a hollow interior. The first end 28 is couplable to the bracket 12 wherein the elongated member 26 extends from the bracket 12. Each of a pair of loops 34 is coupled to the elongated member 26. The loops 34 are aligned wherein the second section 16 of the bracket 12 is insertable through the loops 34 such that the elongated member 26 is supported by the second section 16 of the bracket 12 on the tree 18. The loops 34 may be oriented in parallel planes transverse to a longitudinal axis of the elongated member 26 and statically positioned relative to the elongated member 26.

A pulley 36 is coupled to the elongated member 26 in spaced relationship to the first end 28. Thus, the pulley 36 is positioned in laterally spaced relationship to the tree 18 when the elongated member 26 is supported by the bracket 12. A distal portion 38 of the second section 16 of the bracket 12 relative to the first section 14 is angled relative to a main portion 40 of the second section 16. In use, the step 20 is most stably positioned with the medial section 22 being vertically oriented and the second section 16 being positioned below the first section 14. A length of the main portion 40 of the second section 16 may be slightly greater than a distance between the loops 34 wherein the loops 34 rest upon the main portion 40 of the second section 16 and the distal portion 38 inhibits the loops 34 from sliding off of the second section 16. The distal portion 38 of the second section 16 is coplanar with the medial section 22 of the bracket 12. The distal portion 38 of the second section 16 extends from the main portion 40 of the second section 16 outwardly from the medial section 22 and inwardly towards the first section 14. An eye bolt 42 may be coupled to the elongated member 26. The eye bolt 42 extends from an underside 44 of the elongated member 26. The pulley 36 is coupled to the eye bolt 42 by a shackle 46. The shackle 46 may be rotationally coupled to the pulley 36 by a pin 48 wherein the pulley 36 is rotatable relative to the elongated member 26.

Figure 6:
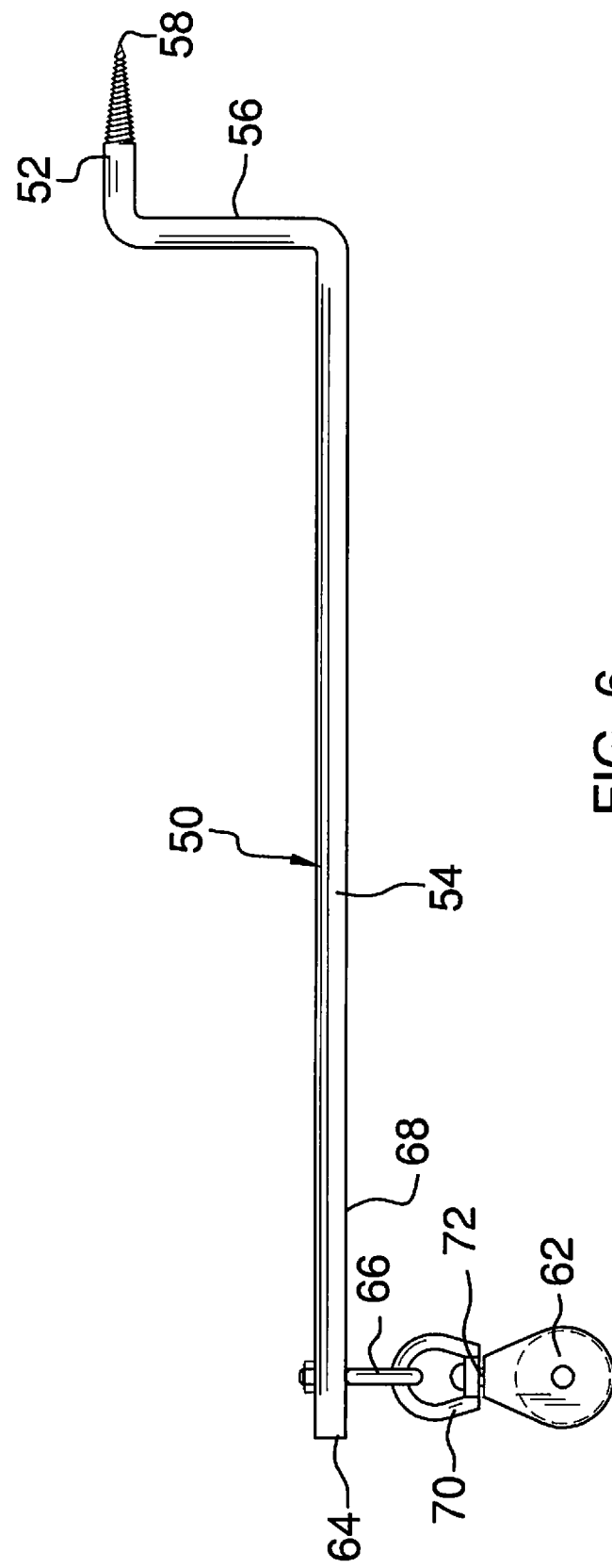
FIG. 6 is a side view of an alternative embodiment of the disclosure.

In an embodiment shown in FIG. 6, a support 50 provides a combination of the bracket 12 and the elongated member 26 in a single piece. The support 50 has a first section 52 and a second section 54. The first section 52 of the support 50 is configured for coupling to the tree 18 wherein the second section 54 extends outwardly from the tree 18. The support 50 has a medial section 56 extending between the first section 52 of the support 50 and the second section 54 of the support 50 wherein the first section 52 of the support 50 is offset from the second section 54 of the support 50. The first section 52 of the support 50 is threaded and has a pointed end 58 wherein the first section 52 of the support 50 is configured for screwing into the tree 18. FIG. 6 is not intended to show precise proportions but generally the second section 54 of the support 50 has a length greater than at least three times a length of the first section 52 of the support 50. More particularly, the second section 54 of the support 50 may have a length greater than five times a length of the first section 52 of the support 50. Similarly to the embodiment shown in FIGS. 1 through 5, a pulley 62 is coupled to the second section 52 of the support 50 proximate a distal end 64 of the second section 54 of the support 50 relative to the first section 52 of the support 50.

Thus, the pulley 62 is positioned in laterally spaced relationship to the tree 18. An eye bolt 66 may be coupled to the support 50. The eye bolt 66 extends from an underside 68 of the support 50. The pulley 62 is coupled to the eye bolt 66 by a shackle 70. The shackle 70 is rotationally coupled to the pulley 62 by a pin 72 wherein the pulley 62 is rotatable relative to the support 50.

In use, the bracket 12 is installed in a conventional manner by screwing the first section 14 into the tree 18. The elongated member 26 is attached to the second section 16 of the bracket by insertion of the second section 16 through the loops 34. The pulley 36 may then be used to lift a tree stand 76 or the like. The embodiment of FIG. 6, is similarly used with the first section 52 of the support 50 being screwed directly into the tree 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tree mounted hoist device comprising:
   a bracket having a first section and a second section, said first section being configured for coupling to a tree wherein said second section extends outwardly from said tree such that second section defines a step extending from the tree;
   an elongated member having a first end and a second end, said first end being couplable to said bracket wherein said elongated member extends from said bracket;
   a pulley coupled to said elongated member in spaced relationship to said first end whereby said pulley is positioned in laterally spaced relationship to the tree; and
   a pair of loops coupled to said elongated member, said loops being aligned wherein said second section of said bracket is insertable through said loops such that said elongated member is supported by said second section of said bracket.

2. The device of claim 1, further comprising said first section of said bracket being threaded and having a pointed end wherein said first section is configured for screwing into the tree.

3. The device of claim 1, further comprising said bracket having a medial section extending between said first section and said second section wherein said first section is offset from said second section.

4. The device of claim 1, further comprising said second section of said bracket having a distal portion relative to said first section, said distal portion of said second section being angled relative to a main portion of said second section.

5. The device of claim 4, further comprising a length of said main portion of said second section being greater than a distance between said loops wherein said loops rest upon said main portion of said second section and said distal portion inhibits said loops from sliding off of said second section.

6. The device of claim 1, further comprising an eye bolt coupled to said elongated member, said eye bolt extending from an underside of said elongated member, said pulley being coupled to said eye bolt by a shackle.

7. The device of claim 6, further comprising said shackle being rotationally coupled to said pulley wherein said pulley is rotatable relative to said elongated member.

8. A tree mounted hoist device comprising:
   a bracket having a first section and a second section, said first section being configured for coupling to a tree wherein said second section extends outwardly from said tree such that second section defines a step extending from the tree, said bracket having a medial section extending between said first section and said second section wherein said first section is offset from said second section, said second section of said bracket having a distal portion relative to said first section, said distal portion of said second section being angled relative to a main portion of said second section, said distal portion of said second section being coplanar with said medial section of said bracket;
   an elongated member having a first end and a second end, said first end being couplable to said bracket wherein said elongated member extends from said bracket; and
   a pulley coupled to said elongated member in spaced relationship to said first end whereby said pulley is positioned in laterally spaced relationship to the tree.

9. The device of claim 8, further comprising said distal portion of said second section extending from said main portion of said second section outwardly from said medial section and inwardly towards said first section.

10. The device of claim 1, further comprising:
    said bracket having a medial section extending between said first section and said second section wherein said first section is offset from said second section, said first section of said bracket being threaded and having a pointed end wherein said first section is configured for screwing into the tree;
    a distal portion of said second section of said bracket relative to said first section being angled relative to a main portion of said second section, a length of said main portion of said second section being greater than a distance between said loops wherein said loops rest upon said main portion of said second section and said distal portion inhibits said loops from sliding off of said second section, said distal portion of said second section being coplanar with said medial section of said bracket, said distal portion of said second section extending from said main portion of said second section outwardly from said medial section and inwardly towards said first section; and
    an eye bolt coupled to said elongated member, said eye bolt extending from an underside of said elongated member, said pulley being coupled to said eye bolt by a shackle, said shackle being rotationally coupled to said pulley wherein said pulley is rotatable relative to said elongated member.

11. A tree mounted hoist device comprising:

a support having a first section and a second section, said first section being configured for coupling to a tree wherein said second section extends outwardly from said tree;

a pulley coupled to said second section of said support proximate a distal end of said second section relative to said first section whereby said pulley is positioned in laterally spaced relationship to the tree; and said support having a medial section extending between said first section and said second section wherein said first section is offset from said second section, said first section of said support being threaded and having a pointed end wherein said first section is configured for screwing into the tree, said second section having a length greater than five times a length of said first section.

12. The device of claim 11, further comprising an eye bolt coupled to said support, said eye bolt extending from an underside of said support, said pulley being coupled to said eye bolt by a shackle, said shackle being rotationally coupled to said pulley wherein said pulley is rotatable relative to said support.

\* \* \* \* \*